United States Patent [19]

te Velde

[11] Patent Number: 4,459,182

[45] Date of Patent: Jul. 10, 1984

[54] METHOD OF MANUFACTURING A DISPLAY DEVICE

[75] Inventor: Ties S. te Velde, Eindhoven, Netherlands

[73] Assignee: U.S. Philips Corporation, New York, N.Y.

[21] Appl. No.: 487,782

[22] Filed: Apr. 22, 1983

Related U.S. Application Data

[62] Division of Ser. No. 240,540, Mar. 4, 1981.

[30] Foreign Application Priority Data

Mar. 4, 1980 [NL] Netherlands .......................... 8001281

[51] Int. Cl.³ .............................................. C25D 5/02
[52] U.S. Cl. .................................... 204/15; 204/38 A
[58] Field of Search .............................. 204/15, 38 A

[56] References Cited

U.S. PATENT DOCUMENTS

4,205,428  6/1980  Ernstaff .................................. 204/15
4,326,929  4/1982  Minezaki ................................ 204/15

Primary Examiner—T. M. Tufariello
Attorney, Agent, or Firm—Paul R. Miller

[57] ABSTRACT

A display device having a transparent supporting plate which is provided with transflective regions. At a short distance from the first supporting plate resilient electrodes are connected which are manufactured from a partially reflective material. By varying the distance between the resilient electrodes and the transflective regions, the reflection of incident light can be controlled from zero to maximum intensity as a result of the occurring interference. Both monocolor and multicolor pictures can be displayed by means of such a display device. Such a display device is particularly suitable for use in a projection television device.

4 Claims, 10 Drawing Figures

METHOD OF MANUFACTURING A DISPLAY DEVICE

This is a divisional application of Ser. No. 240,540, filed Mar. 4, 1981, and all the benefits of such earlier application are hereby claimed for this new application.

The invention relates to a display device comprising a transparent first supporting plate having a transflective layer, and a partially reflective layer which reflects to substantially the same extent as the transflective layer and which is spaced apart from the transflective layer and which is secured so as to be movable to the first supporting plate in such manner that when light is incident on the device, interference phenomena occur dependent on the distance between the transflective layer and the partially reflective layer. By a transflective layer is meant a layer which partially transmits and partially reflects impinging light.

The invention also relates to a method of manufacturing such a display device. The invention further relates to a data processing device and to a projection television device having such a display device.

Such a display device is disclosed in U.S. Pat. No. 2,534,846. In this device an incident light beam is partly reflected and partly transmitted by the reflective layer after which the transmitted light is partly reflected by the partially reflective layer. The coefficient of reflection of the transflective and partially reflective layer are approximately equal to each other so that the two layers constitute a so-called Fabry-Perot interferometer. Dependent on the distance and the medium between the transflective layer and the partially reflective layer, interference occurs between the light reflected directly by the transflective layer and the light reflected by the partially reflective layer. The transflective and partially reflective layers are provided on opposite sides of a piezo-electric crystal. The distance between the transflective and reflective layer is controlled by means of a voltage provided across the layers so that the thickness of the piezo-electric crystal varies to a greater or lesser extent. The construction and control of such a device, however, are not suitable for use in a display device in which the picture is constructed from a large number of individually controllable display elements.

It is therefore the object of the invention to provide a display device which can be constructed in a simple manner by means of a large number of display elements.

A further object of the invention is to provide a display device which is suitable for displaying alpha-numerical and video information.

Still a further object of the invention is to provide a display device which can be both voltage-controlled and charge-controlled.

Still another object of the invention is to provide a display device with which information can be observed in colour.

For that purpose, according to the invention, a display device of a kind mentioned in the opening paragraph is characterized in that the partially reflective layer constitutes a pattern of resiliently connected electrodes and the transflective layer is divided into regions which are common for one or more resiliently connected electrodes.

An embodiment of a display device of the invention, which can be constructed as a so-called crossbar display, is characterized in that the pattern of resiliently connected electrodes constitutes a first grid of parallel strips and the common regions of the transflective layer constitute a second grid of parallel strips which cross the strips of the first grid.

A further embodiment of a display device of the invention is characterized in that the pattern of resiliently connected electrodes constitutes a first set of electrodes and the regions of the transflective layer constitute a second set of electrodes. By applying a voltage across the electrodes of the first set and the electrodes of the second set, a resiliently connected electrode of the first set is attracted to an electrode of the transflective layer as a result of electrostatic force, which movement, however, is counteracted by the resilience of the resiliently connected electrode. Below a given voltage dependent on the distance between the electrodes a stable equilibrium occurs between the electrostatic force and the resilience so that over a certain region of the electrode distance the distance between a resilient electrode and an electrode of the transflective layer can be adjusted. At larger values of the voltage of equilibrium between the electrostatic force and the resilience becomes unstable so that the resiliently connected electrode is accelerated towards the electrode of the transflective layer.

Still a further embodiment of a display device of the invention is characterized in that the pattern of resiliently connected electrodes constitutes a first set of electrodes and a second supporting plate which is provided with a set of electrodes in registration with the regions of the transflective layer is spaced apart from the first supporting plate. The distance between a resiliently connected electrode and a region of the transflective layer is varied by applying a voltage across an electrode of the second supporting plate and a resiliently connected electrode. Since the distance between the second supporting plate and the partially reflective layer of the resiliently connected electrodes can be chosen to be larger than the distance between the first supporting plate and the partially reflective layer of resilient electrodes, the range within which a stable equilibrium occurs between the electrostatic force and the resilience is larger than in the above-described previous embodiment. As a result of this, for controlling the observed reflection between maximum and minimum intensity, zero order effects may be used. The advantage of this is that the angle independence of the observed phenomena is large.

Again another embodiment in which the electrodes of the first set are interconnected and the electrodes of the second set are strip-shaped is characterized in that a second supporting plate is provided at some distance from the first supporting plate and has a third set of strip-shaped electrodes which cross the strip-shaped electrodes of the second set. By applying suitable voltages across electrodes of the first, second and third sets, the resiliently connected electrodes may engage either the first supporting plate or the second supporting plate. It is to be noted that a display device having two supporting plates provided with electrodes and having resiliently connected electrodes between the supporting plates is known per se from Netherlands patent application No. 7510103. This Application, however, deals with a liquid-filled display device, while the distance between the supporting plates is much larger than the small distance between the supporting plates required for interference in a display device according to the invention.

Another embodiment of a display device is characterized in that the display device comprises means to provide charge on the resilient electrodes. The control of the display device by means of charge has the advantage that throughout the distance between a resiliently connected electrode and an electrode of the transflective layer the electrostatic force occurring as a result of the charging can be in equilibrium with the resilience of a resiliently connected electrode.

A further embodiment of a charge control display device is characterized in that the first supporting plate forms part of a glass envelope which comprises an electron gun to generate an electron beam directed onto the first supporting plate, which electron beam scans the first supporting plate according to a regular pattern and charges the resiliently connected electrodes. The resilient electrodes are provided with the desired charge by modulating the electron beam in known manner in accordance with the presented information.

Such a display device is suitable for a data processing device which comprises a light source, first optical means to obtain a parallel light beam which is incident on the display device, which display device modulates the incident light.

Coloured pictures can be obtained by using a light source which emits red, green and blue light.

Such a display device is particularly suitable for a projection television device which has at least two display devices, each of which display devices comprises a light source which emits light of one colour, first optical means to obtain a parallel light beam which is incident on the display device which modulates the incident light, and second optical means to project the modulated light on a screen which is common for the display devices. Each display device is used to modulate light of one colour, the pictures of the display devices being projected on a screen so as to be overlapping so that a coloured picture is observed.

It is to be noted that a projection television device is disclosed in U.S. Pat. No. 3,746,911 in which mirrors, which can be deformed, are charged by means of an electron beam. Dependent on the charge, the mirrors are curved more or less. The reflected light is displayed on a screen by means of a Schlieren optical system.

In such a prior art projection television device, however, annoying diffraction patterns occur which are caused by the gaps between the mirrors. Moreover, the required Schlieren optical system is a complicated optical system since this is required to display the reflected light of the curved mirrors on the screen but is also required to block the reflected light of the non-curved mirrors.

A first method of manufacturing a display device according to the invention is characterized by the following steps:
(a) providing a pattern of a transflective material on a supporting plate,
(b) providing a layer of aluminium which can be etched by means of a first etchant,
(c) anodizing regions of the layer of aluminium which should remain connected to the supporting plate,
(d) electro depositing a layer of an electrode material which can be etched by means of a second etchant,
(e) providing the electrode pattern in the layer of electrode material by means of a photo-etching method and the second etchant,
(f) removing the non-anodized parts of the aluminium by the edges of the layer of electrode material by means of the first etchant.

A second method of manufacturing a display device is characterized by the following steps:
(a) providing a pattern of a transflective material on a supporting plate,
(b) providing a layer of aluminium which can be etched by means of a first etchant,
(c) removing regions in the layer of aluminium by means of a photo-etching method and the first etchant,
(d) electro depositing a layer of an electrode material which can be etched by means of a second etchant,
(e) providing an electrode pattern in the layer of electrode material by means of a photo-etching method and the second etchant,
(f) removing the layer of aluminium by the edges of the layer of electrode material by means of the first etchant.

In order to ensure the parallelism of the part of the resilient electrode which is effective for display with the transflective layer and to make this independent of the actual resilient flexible parts of the resilient electrodes, according to a further embodiment of the first or second method, the effective part of the resilient electrodes, after step e, is provided by electro deposition with a reinforcement layer of electrode material which can be etched by means of the second etchant.

In this manner it is possible to manufacture resiliently connected electrodes with a very large smoothness, which electrodes are present at a very short distance from the supporting plate substantially without mechanical stresses.

The invention will now be illustrated with reference to the accompanying drawing, of which

Figure 1A:
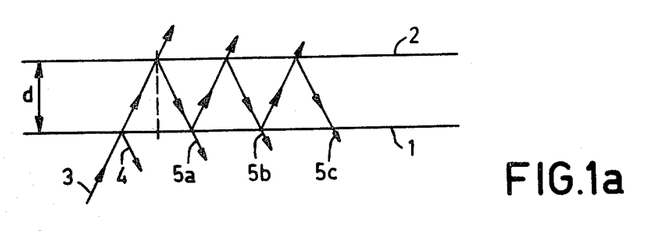
FIGS. 1a and 1b are diagrammatic drawings to illustrate the operating principle of the display device.

The operating principle of a display device in accordance with the invention will be explained with reference to FIG. 1a. Shown diagrammatically are a transflective layer 1 and a partially reflective layer 2 present at a distance d therefrom. The coefficient of reflection of layer 1 and layer 2 is approximately the same. A part of an incident light beam 3 is reflected by the transflective layer 1 and a part is transmitted. The transmitted light is partially reflected by the partially reflective layer 2. The light not reflected by the layer 2 can be transmitted or be absorbed by the layer 2. By repeated internal reflections at the layers 1 and 2, a number of parallel partial beams 5a, 5b and 5c are formed with decreasing intensity. When these parallel partial beams 5 together have substantially the same intensity as the partial beam 4 directly reflected at the layer 1, the intensity of the reflected light as a result of the occurring interference can be controlled, by varying the distance d for a given wavelength, between substantially 0 and a maximum value which depends on the reflection coefficient of the layers 1 and 2. When the incident light beam is composed of light of several wavelengths, reflected light of the successive wavelengths is observed when the distance d is varied.

Figure 1B:
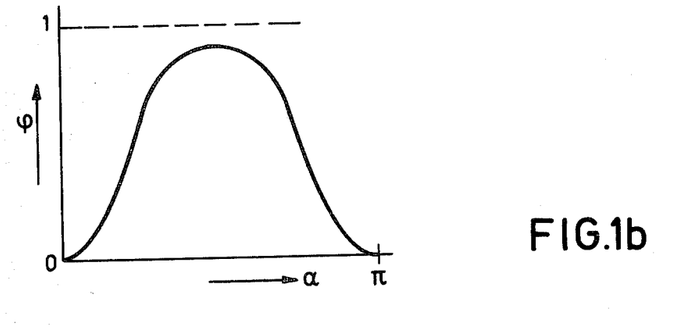

FIG. 1b shows the relative intensity ρ of the total reflected light as a function of the phase difference α determined by the distance between the layers 1 and 2, between the light reflected directly at the layer 1 and reflected at the layer 2, for a reflection coefficient of the layers 1 and 2 of 0.5.

Figure 2:
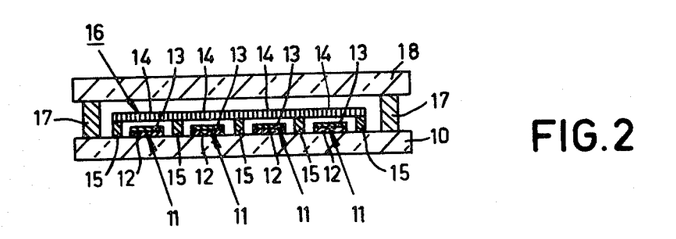
FIG. 2 is a sectional view of a first embodiment of a display device.

FIG. 2 is a diagrammatic sectional view of an embodiment of a display device. A plurality of strip-shaped transflective electrodes 11 are provided on a glass supporting plate 10. The electrodes 11 are formed by a 0.05 μm thick layer 12 of indium oxide or tin oxide on which a 0.01 to 0.02 μm thick layer 13 of chromium is provided. Instead of the layers 12 and 13, one layer only of chromium may be provided, if desired. Electrodes 14 are resiliently connected to pillars 15 at a distance of 0.3 μm from the strip-shaped electrodes 11. The electrodes 14 are interconnected in such manner that strip-shaped electrodes 16 are formed which are substantially at right angles to the strip-shaped electrodes 14. In this manner a so-called cross-bar display is obtained in which the electrodes 14 constitute the columns and the electrodes 16 constitute the rows of the display device. The resilient electrodes 14 are manufactured from nickel and have a thickness of 0.3 μm. The pillars 15 are manufactured from aluminium oxide. The pillars 15 may also be manufactured from the layer of nickel of the resilient electrodes themselves, which will be explained in detail with reference to FIG. 10d.

Figure 3:
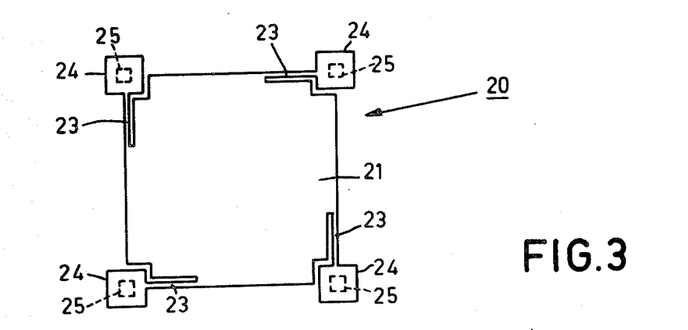
FIG. 3 is a plan view of a resilient electrode.

FIG. 3 is a plan view of an individual resilient electrode 20. Each electrode 20 comprises a central portion 21 which by thin strips 23 is secured to the pillars 25 shown in broken lines by means of the pads 24. The strips 23 constitute resilient elements of the display element so that the central portion 21 of the electrodes 20 can be moved parallel to itself in a direction perpendicular to the electrodes. The electrode 20 has an area of $200 \times 200$ μm$^2$.

Figure 4A:
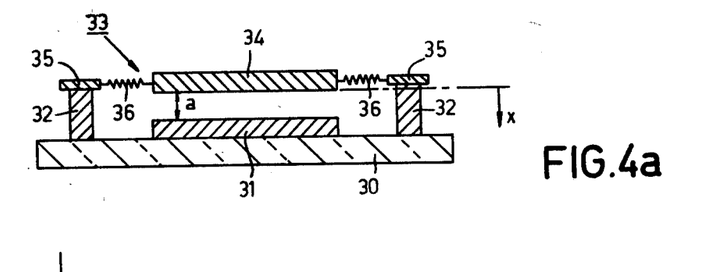
FIGS. 4a and 4b illustrate the operation of the display device in the case in which the display device is voltage-controlled.

The operation of a resilient electrode will be explained in detail with reference to FIGS. 4a and 4b. FIG. 4a shows diagrammatically one display element in which a transflective electrode 31 is provided on a glass supporting plate 30 and a resilient electrode 33 is provided at a distance a therefrom by means of the pillars 32. The resilient electrode 33 may be represented as a central reinforced portion 34 which is connected to the pads 35 by means of the springs 36 having a collective spring constant C. When a voltage V is applied across the electrodes 31 and 33 the central portion 34 experiences an electrostatic force directed towards electrode 31 and an oppositely directed resilience. The electrode 34 is in equilibrium when it holds that:

$$V = (a - x)\left(\frac{2Cx}{\epsilon_o}\right)^{\frac{1}{2}},$$

where x is the displacement of the portion 34 and $\epsilon_o$ is the permittivity of the space between electrodes 31 and 33.

Figure 4B:
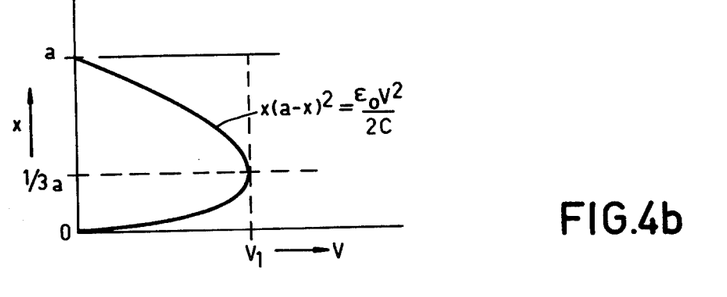

In FIG. 4b, the above equation is shown as a plot of V against X. For voltages below $$V_1 = \left(\frac{8}{27} \frac{ca^3}{\epsilon_o}\right)^{\frac{1}{2}}, X = \frac{1}{3}a$$

the equilibrium between the electrostatic force and the resilience is stable. For voltages above $V_1$ the equilibrium becomes labile and the electrode 34 flips towards electrode 31.

Figures 4C, 5A:
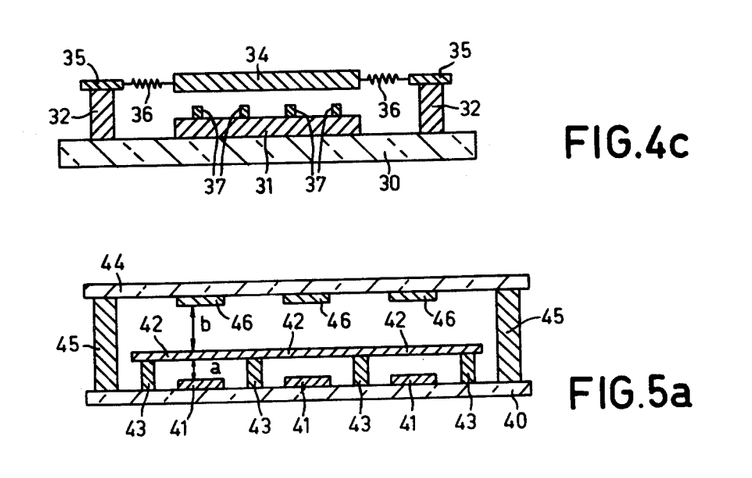
FIG. 4c illustrates the operation of a modified display device in accordance with the invention.
FIGS. 5a and 5b are sectional views of further embodiments of a display device.

The display device can be operated in various ways. According to a first way, the electrodes are controlled by voltages which are smaller than $V_1$ so that the electrode 34 can move over a distance $X = \frac{1}{3}a$ taken from the position in which the electrode 34 is at a distance a from the electrode 31 at a voltage $V = 0$. When a light beam of wavelength $\lambda_1$ i.e. light of one colour impinges on the display device, at an angle α to the normal of the first supporting plate and when the distance between the resilient electrode 33 and electrode 31 at $V = 0$ is equal to $a = \frac{3}{4}\lambda_1/\cos \alpha$, then, by varying the distance over a range of $\frac{1}{3}a$, the reflection of the incident light can be controlled from zero to maximum intensity. When the incident light beam comprises light of various wavelengths, reflected light of the respective wavelengths and hence colours are observed when varying the distance between the electrodes. It is also possible to use the bistable mode in which the resilient electrode 34 can be only in two extreme positions. For this purpose an embodiment slightly varied with respect to FIG. 4a is necessary as shown in FIG. 4c, in which corresponding components are referred to by the same reference numerals. At a voltage $V = 0$ the electrode 34 is at a distance a from the electrode 31. This distance a has been chosen so that maximum reflection occurs for light of a wavelength $\lambda_1$ incident at an angle α. At a voltage exceeding $V_1$ the resilient electrode 34 flips to electrode 31. In order to prevent short-circuit, the electrode 31 has a number of insulating pillars 37 the height of which has been chosen to be so that when the electrode 34 engages the pillars 37 the distance between the resilient electrode 34 and electrode 31 is just equal to the distance for which the reflection of the incident light beam is zero. When an incident light beam is used having light of two wavelengths, the extreme positions of the resilient electrode 33 can be chosen to be so that in one position the reflection of light of the first wavelength and in the other position reflection of light of the second wavelength is maximum. It is also possible to use the display device with ambient light. When the angle at which the display device is observed is varied, the wavelength and hence the colour of the reflected light will vary, but the contrast of the observed picture is maintained.

FIG. 5a is a sectional view of another embodiment of a display device. A number of strip-shaped transflective regions 41 are provided on a glass supporting plate 40. A plurality of resilient electrodes 42 is provided at a distance a from the regions 41 by means of pillars 43. The resilient electrodes 42 are interconnected and constitute strip-shaped electrodes which cross the strip-shaped regions 41. Spaced apart from the first supporting plate 40 is a second supporting plate 44 which is supported by a frame 45. A number of strip-shaped electrodes 46 are provided on the supporting plate 44 so as to be in registration with the strip-shaped regions 41 on the supporting plate 40 and which are at a distance b from the resilient electrodes 42. The distance between the resilient electrodes 42 and the strip-shaped transflective regions 41 is varied by applying a voltage across the resilient electrodes 42 and the strip-shaped electrodes 46 on the second supporting plate 44. This embodiment has the advantage that the resilient electrodes 42 can be driven over a large range. The distance b between the electrodes 46 and the resilient electrodes 42 can as a matter of fact be chosen to be larger than the distance a between the resilient electrodes 42 and the strip-shaped transflective regions 41. The distance of $\frac{1}{3}$b over which the resilience is in stable equilibrium with the electrostatic force thus is larger than the distance $\frac{1}{3}$a as is the case in the FIG. 2 embodiment.

In the FIG. 2 embodiment it is not possible in the case of voltage control to use the zero order maximum in the intensity of the reflected light since the displacement of the resilient electrode over a distance $\frac{1}{3}$a is not sufficient to make the distance between the resilient electrode and the transflective layer equal to the distance for which the reflection of the light is equal to zero. In the present embodiment, due to the larger distance $\frac{1}{3}$b over which the resilient electrode can be moved it is possible, starting from the zero order maximum to move the resilient electrode so that the reflection of the light is equal to zero. The use of zero order effects has the advantage that the picture can be observed at a large angle in contrast with higher order effects where, upon variation of the angle at which the image is observed, successively maximum reflection and no reflection is observed. The distance a is, for example, 0.05 $\mu$m and the distance b is, for example, 10 $\mu$m, so that the maximum distance between the resilient electrodes 42 and the strip-shaped regions 41 is substantially 3 $\mu$m.

Figure 5B:
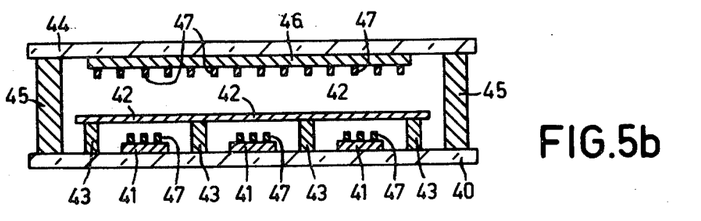

FIG. 5b is a sectional view of a further embodiment of a display device. Corresponding components are referred to by the same reference numerals as in FIG. 5a. A number of strip-shaped electrodes 46 are provided on the supporting plate 44 and intersect the strip-shaped electrodes 41 at right angles. A number of pillars 47 of insulating material are provided on the electrodes 41 and 46. As is known per se from Netherlands patent application No. 7510103 the device is bistable, that is to say the resilient electrodes 42 may be only in two extreme positions. By applying suitable voltages across the electrodes 41, 42 and 46, the resilient electrodes 42 may engage either the pillars 47 on electrodes 41 or pillars 47 on electrodes 46. The height of the pillars 47 is chosen to be so that, for example, with an incident light beam of two wavelengths in one extreme position of the resilient electrode the reflection of the light of the first wavelength is maximum and in the other extreme position the reflection of the light of the second wavelength is maximum. It is also possible to use the display device with ambient light.

Figure 6A:
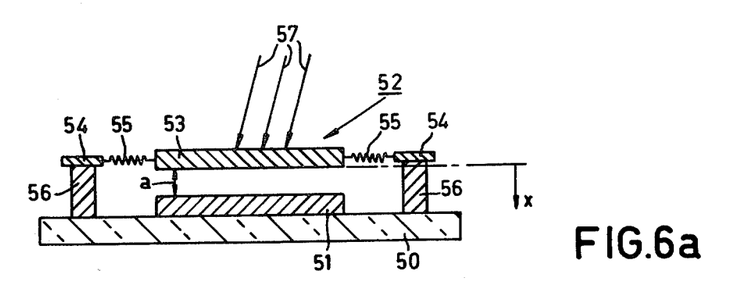
FIGS. 6a and 6b illustrate the operation of the display device in the case in which the display device is charge-controlled.

The operating principle of a further embodiment of the display device will be explained with reference to FIGS. 6a and 6b. Only one display element is shown diagrammatically. A transflective electrode 51 is provided on a glass supporting plate 50. A resilient electrode 52 which may be represented by a central reinforced portion 53 which is connected to pads 54 by means of springs 55 is provided at a distance a from the electrode 51 by means of pillars 56. The resilient electrode 53 is charged by means of an electron beam 57. As a result of a charge Q electrode 53 experiences an electrostatic force $F_e=(Q^2/2\epsilon_0 A)$, where A is the area of the electrode 53. From this formula it appears that the force is proportional to the square of the charge and is independent of the distance between the resilient electrode 53 and the electrode 51. As a result of the electrostatic force electrode 53 also experiences an oppositely directed resilience $F_v=CX$, where C is the collective spring constant of the springs 55 and X is the displacement of the electrode 53.

Figure 6B:
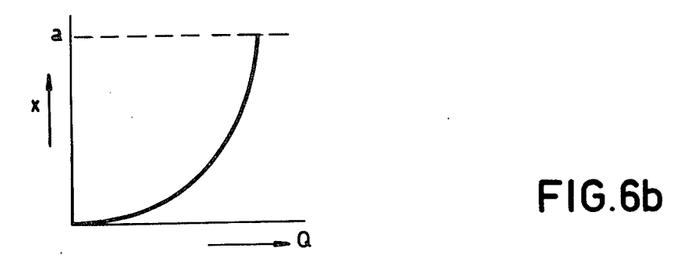

FIG. 6b shows how the displacement of the resilient electrode 53 depends on the charge Q provided by the electron beam 57. From this it appears that when the resilient electrode 53 and the electrode 51 are separated by any amount between 0 and a the electrostatic force is in stable equilibrium with the resilience so that the electron 53 can be driven over the whole distance a.

Figure 7A:
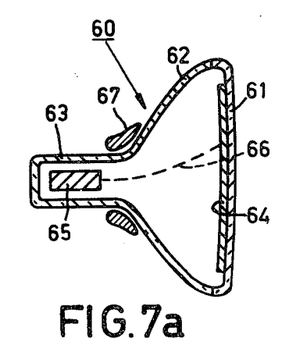
FIG. 7a is a sectional view of a fourth embodiment of a display device.

FIG. 7a shows a practical embodiment of a display device in which the resilient electrodes are charged by means of an electron beam. A glass envelope 60 comprises a display window 61, a cone 62 and a neck portion 63. On the inside of the display window 61 a matrix of display elements 64 is provided. An electron gun 65 to generate an electron beam 66 is provided in the neck 63. The electron gun 65 may be of any known construction and needs no further explanation. By means of a system of deflection coils 67 placed around the glass envelope the electron beam 66 is deflected, the matrix 64 of display elements being scanned according to a frame of parallel lines. The electron beam 66 is modulated in known manner with the presented video information. In this manner the individual picture elements are provided with a charge as a result of which the resilient electrodes are attracted to a greater or lesser extent to the fixed common electrode on the display window 61 which is earthed.

For displaying motion television pictures the display window should be scanned as a whole by the electron beam 25 times per second. The charge on each of the resilient electrodes should therefore leak away in approximately 1/25 sec. This relaxation time of the resilient electrode is produced by connecting the resilient electrodes via a resistor to the earthed electrode on the display window.

Figure 7B:
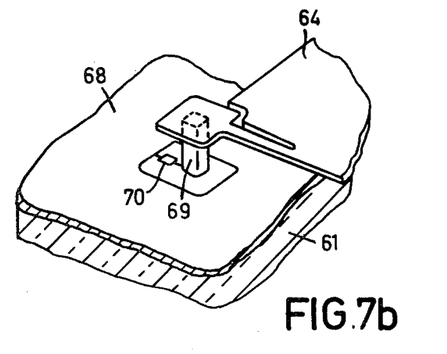
FIG. 7b shows a detail of the display device of FIG. 7a, FIG. 8 shows an embodiment of a device having a display device in accordance with the invention.

FIG. 7b is a perspective view of a manner in which this can be realized. A resilient electrode 64 is spaced apart from the display window 61 by means of a pillar 69. An electrode 68 insulated from the pillar 69 is provided on the display window and is earthed. The resilient electrode 64 is connected to the electrode 68 via the resistor 70 so that the charge on the resilient electrode 64 can leak away in a certain period of time via the pillars 69 and resistors 70.

Figure 8:
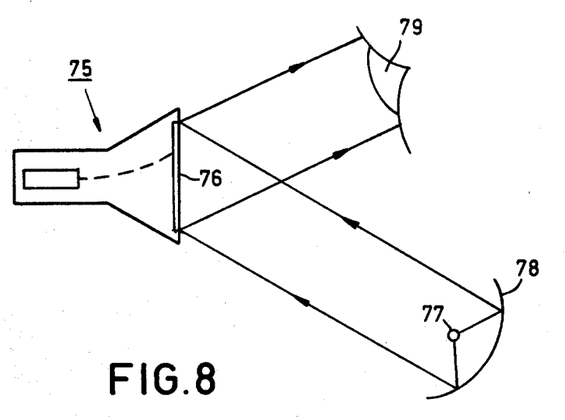

Such a display device is suitable for use in a data processing device (data display). FIG. 8 shows an embodiment of such a device. Reference numeral 75 is a display device as shown in FIG. 7a. The display window 76 of the display device 75 is illuminated uniformly at a given angle by a light source 77 which is placed at the focal point of a parabolic mirror 78. The spectrum of the light emitted by the light source 77 comprises three narrow bands around the wavelengths $\lambda_1 = 0.6$ $\mu$m (red), $\lambda_2 = 0.54$ $\mu$m (green) and $\lambda_3 = 0.45$ $\mu$m (blue). Dependent on the distance between the resilient electrodes and the electrodes on the display window which is determined by the quantity of charge which the electron beam deposits on the resilient electrodes in accordance with the presented information, light of a given wavelength and hence colour is reflected. Herewith it is possible, for example, to display coloured letters against a differently coloured background. A bright colour picture the brightness of which is determined for the greater part by the intensity of the light beam incident on the display screen is observed by an observer 79.

Figure 9:
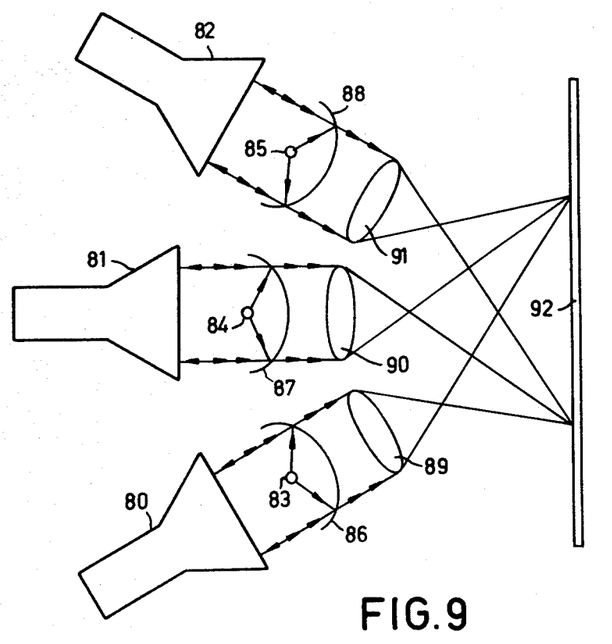
FIG. 9 shows an embodiment of a projection television device in accordance with the invention, FIGS. 10a, b, c and d illustrate the methods of manufacturing a display device in accordance with the invention.

FIG. 9 is a plan view of an embodiment of a projection television device in accordance with the invention. The device comprises three display devices 80, 81 and 82. Three light sources 83, 84 and 85 which are placed at the focal points of parabolic mirrors 86, 87 and 88, ensure that a parallel light beam is incident on each of the display devices 80, 81 and 82.

The light sources 83, 84 and 85 emit red, green and blue light, respectively, so that red, green and blue pictures, respectively, are reflected by the display devices 80, 81 and 82. The three mono-coloured pictures are projected on the screen 92 by means of the lenses 89, 90 and 91 in such manner that the three pictures overlap each other. A coloured picture is observed on the screen.

Figure 10A:
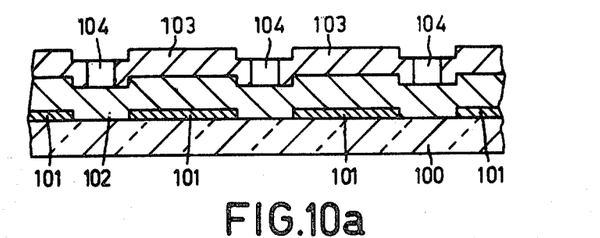
Figure 10B:
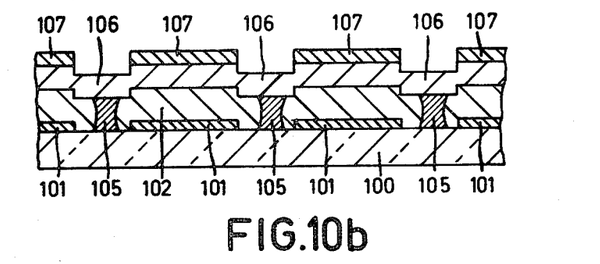
Figure 10C:
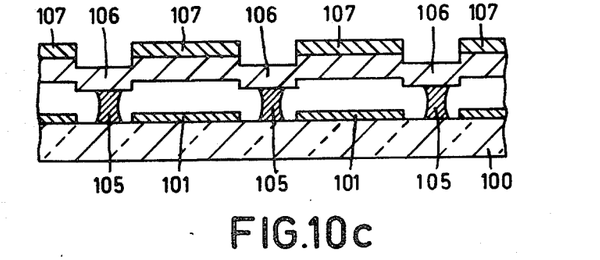
Figure 10D:
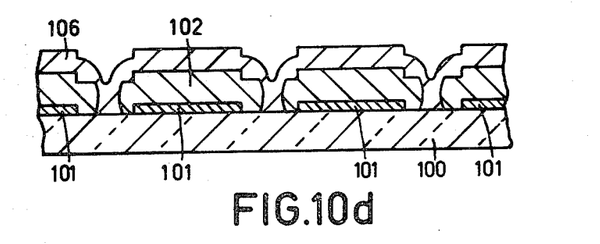

An embodiment of a method of manufacturing a display device will be explained with reference to FIG. 10. FIG. 10a shows a glass supporting plate 100 on which a pattern 101 of chromium is vapour-deposited in a thickness of 0.01 to 0.02 $\mu$m. A 0.4 $\mu$m thick aluminium layer 102 is is provided across it. A layer 103 of a photolacquer is then provided on the aluminium layer 102. Apertures 104 are provided in the layer 103 in known manner. The apertures 104 correspond to the areas in the aluminium layer 102 which should remain connected to the supporting plate 100. At the area of the apertures 104 the aluminium is then anodized after which the layer 103 is removed. These anodized regions are denoted in FIG. 10b by reference numeral 105. A nickel layer 106 in a thickness of 0.15 $\mu$m is provided on the aluminium layer 102. The nickel layer 106 is provided by electroplating the layer from a nickel sulphanate bath. As a result of this a nickel layer is obtained which engages the aluminium layer 102 substantially without mechanical stresses. By means of a known photoetching method the shape of the resilient electrode as shown in FIG. 3 is etched in the layer 106. The etchant is nitric acid which does not attack the underlying aluminium layer 102 and the anodized regions 105. In order to ensure the parallelism of the central parts of the resilient electrodes (see FIG. 3) with the electrodes 101 and to make it independent of the actual resilient flexible parts of the electrodes, the central portions of the resilient electrodes are provided with a reinforcing layer 107 of Ni or Ag which is provided by electroplating. Etching with concentrated $H_3PO_4$ at 60° C. is then carried out which does not attack the nickel layer 106 and the anodized regions 104 but does attack the aluminium layer 102. The aluminium layer 102 is removed by so-called "underetching" the edges of the electrodes, after which the construction shown in FIG. 10c is obtained. According to a second embodiment of a method of manufacturing a display device, the aluminium in the stage shown in FIG. 10a is not anodized but etched away at the area of the apertures 104. The nickel layer 106 is then provided which now also covers the walls of the apertures in the aluminium layer 102. FIG. 10d shows the result hereof. The resilient electrodes are kept at a distance from the supporting plate 100 by nickel pillars. The method continues in the same manner as the first embodiment. The flatness of the resilient electrodes is particularly good due to the electroplating of the layer 107. The distance between resilient electrodes and the transflective regions 101 can be determined with very great accuracy by means of the thickness of the layer of vapour-deposited aluminium.

What is claimed is:

1. A method of manufacturing a display device characterized by
   (a) providing a pattern of a transflective material on a supporting plate,
   (b) providing a layer of aluminum over said supporting plate, said layer being etchable with a first etchant,
   (c) anodizing regions of the layer of aluminum which remain connected to the supporting plate,
   (d) depositing a layer of an electrode material over the layer of aluminum, said electrode material being etched with a second etchant,
   (e) providing an electrode pattern in the layer of electrode material by using a photo-etching method and the second etchant, and
   (f) removing the non-anodized parts of the aluminum below the edges of the layer of electrode material with the first etchant.

2. A method as claimed in claim 1, characterized in that, after step (e), the effective part of the electrodes of the electrode pattern is provided with a reinforcing layer.

3. A method of manufacturing a display device characterized by:
   (a) providing a pattern of a transflective material on a supporting plate,
   (b) providing a layer of metal over said supporting plate, said layer being etched by means of a first etchant,
   (c) removing regions in the metal layer by using a first photo-etching method and the first etchant,
   (d) depositing a layer of an electrode material over said metal layer and into said removed regions, said electrode material being etched by means of a second etchant,
   (e) providing an electrode pattern in the layer of electrode material by using a second photo-etching method and the second etchant, and
   (f) removing the metal layer below the edges of the layer of electrode material by means of the first etchant.

4. A method as claimed in claim 3, characterized in that, after step (e), the effective part of the electrodes of the electrode pattern is provided with a reinforcing layer.

* * * * *